United States Patent [19]
Hauth et al.

[11] 3,869,024
[45] Mar. 4, 1975

[54] SELF RELEASING BRAKE DEVICE

[75] Inventors: Jean-Marc Hauth, Pont-A-Mousson; Roland Claude Michel Cheylac, Augny, both of France

[73] Assignee: Pont-A-Mousson S.A., Pont-A-Mousson, France

[22] Filed: July 6, 1973

[21] Appl. No.: 376,994

[30] Foreign Application Priority Data
July 7, 1972 France............................ 72.24727

[52] U.S. Cl............... 188/72.5, 188/71.9, 188/72.2, 188/73.4, 188/196 BA, 192/54, 192/70.23, 192/70.25, 192/111 A
[51] Int. Cl.......................................... F16d 55/228
[58] Field of Search...... 188/70 R, 70 B, 71.1, 71.9, 188/72.2, 72.7, 73.4, 196 BA, 72.5; 192/70.23, 70.25, 111 A, 93 R, 54

[56] References Cited
UNITED STATES PATENTS

| | | | |
|---|---|---|---|
| 2,820,530 | 1/1958 | Chollings et al. | 188/71.9 |
| 3,156,325 | 11/1964 | Taylor | 188/72.5 |
| 3,405,785 | 10/1968 | Schmid | 188/72.2 |
| 3,430,736 | 3/1969 | Long | 188/72.7 |
| 3,727,727 | 4/1973 | Hauth | 188/72.2 |

FOREIGN PATENTS OR APPLICATIONS

| | | | |
|---|---|---|---|
| 1,034,172 | 6/1966 | Great Britain | 188/72.2 |
| 966,198 | 8/1964 | Great Britain | 188/73.4 |

*Primary Examiner*—George E. A. Halvosa
*Attorney, Agent, or Firm*—Sughrue, Rothwell, Mion, Zinn & Macpeak

[57] ABSTRACT

For a moving element such as a disc. Two brake sub-assemblies are mounted on each side of the element on a support which is slidable in a direction perpendicular to the rubbing surfaces of the moving element. Each sub-assembly comprises a brake pad having a friction surface parallel to the corresponding rubbing surface of the moving element and an opposed inclined surface parallel to a support surface of support means fixed to the support, the inclined surface cooperating with the support surface and actuating means connected to the pad for urging the pad in a direction substantially opposed to the direction of movement of the moving element. The two sub-assemblies are oriented in opposite directions on each side of the moving element. Each sub-assembly includes means for ensuring, in each direction of movement of the moving element, that one of the pads is selectively rendered integral with the support.

15 Claims, 6 Drawing Figures

3,869,024

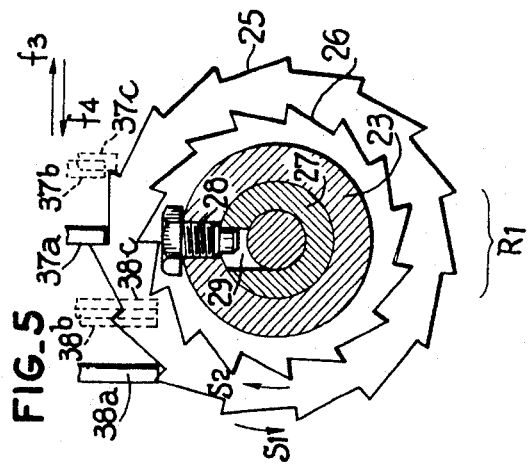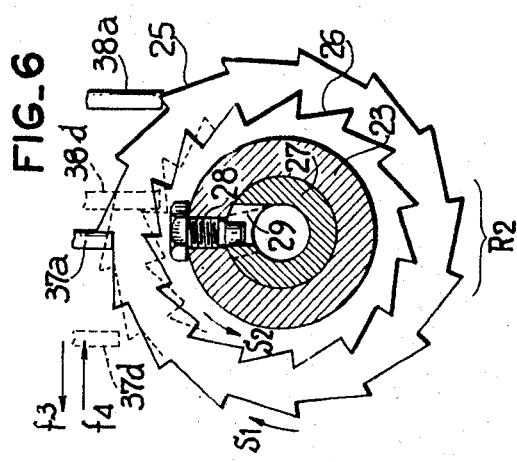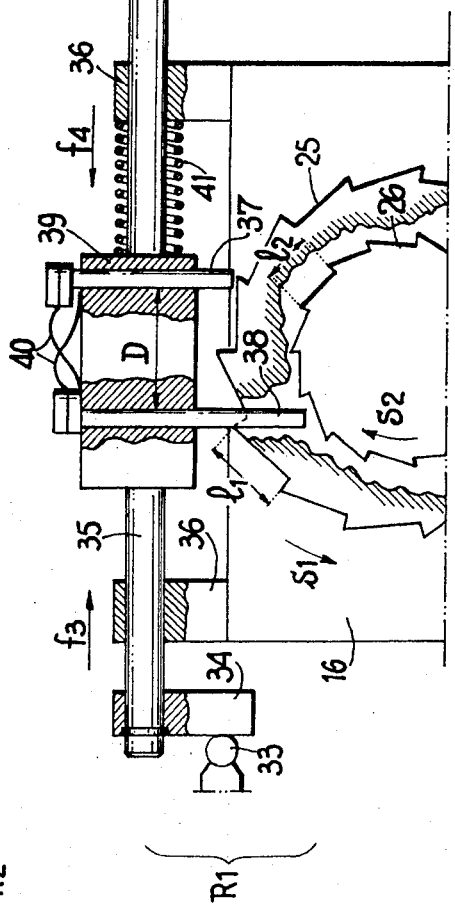

SELF RELEASING BRAKE DEVICE

The present invention relates to a brake device and in particular to a disc brake device of the type in which the braking forces are oriented in particular directions so as to impart to the brake the quality of stability (constancy of the braking torque) irrespective of variations in the coefficient of friction, and efficiency (high braking torque).

Brakes of this type are described in U.S. Pat. No. 3,727,727 and in U.S. Pat. application Ser. No. 374,443, filed June 28, 1973. In the structure described in this patent and in this addition the quality of stability is only abtained for a single direction of rotation of the disc, which is moreover sufficient in numerous industrial applications.

An object of the present invention is to broaden the field of application of such a brake device and provide a device which has the same qualities of stability and efficiency in both directions of rotation of the disc or, more broadly, both directions of movement of the moving element.

The invention provides a device for braking a moving element, such as a disc, having two parallel rubbing surfaces, the device comprising two brake sub-assemblies disposed on each side of the moving element on a common support and each one comprising first or support means fixed to the support and having a support surface slightly inclined with respect to the adjacent rubbing surface, at least one brake pad provided with a friction surface parallel to the rubbing surface and an inclined surface parallel to the support surface and cooperating with the support surface, the pad being connected to second or actuating means which act, for braking, in a direction substantially opposed to the direction of movement of the moving element, wherein the two brake sub-assemblies are oriented in reverse directions on each side of the moving element on a floating support capable of moving in a known manner in a direction substantially perpendicular to the rubbing surfaces, each subassembly having third means for ensuring, in each direction of movement of the moving element, that one of the two brake pads is selectively rendered integral with the floating support.

The aforementioned third means may be constituted by an end-of-travel abutment of the actuating means which locks the actuating means and the associated pad.

According to another feature of the invention, the brake pad which is rendered temporarily integral with the floating support is that which is capable of being displaced by the movement of the moving element in the same direction as under the action of its own actuating means.

In addition to the main problem mentioned hereinbefore there is the problem of taking up wear of the brake, this problem arising from the reversibility of operation of the device according to the invention and from the fact that the pad is temporarily integral with the floating support after having been displaced to its maximum extent with respect to its support means. Indeed, in the main patent, the extent of this displacement is employed for controlling the taking up of the wear so that if a single device for taking up wear of this type were employed in the two sub-assemblies the disc would be very quickly locked.

Therefore, another object of the invention is to provide a brake device in which each pad is provided with a unidirectional device for taking up wear, that is to say a device which is operative in one direction of rotation of the disc and neutralized in the other direction.

Further features and advantages of the invention will be apparent from the ensuing description with reference to the accompanying drawings.

In the drawings:

FIG. 3 is a sectional detail view on an enlarged scale of a brake pad and its actuating and support means in a plane passing through the axis X—X shown in FIG. 2 and perpendicular to the plane of FIG. 2;

FIG. 4 is a diagrammatic detail view of one of the devices for taking up wear with parts cut away to reveal hidden parts, and FIGS. 5 and 6 are diagrammatic views illustrating the operation of the devices for taking up wear for one direction of rotation of the disc the essential parts being shown in full line in order to render the drawing more clear even if they are hidden in the drawing.

Figure 1:
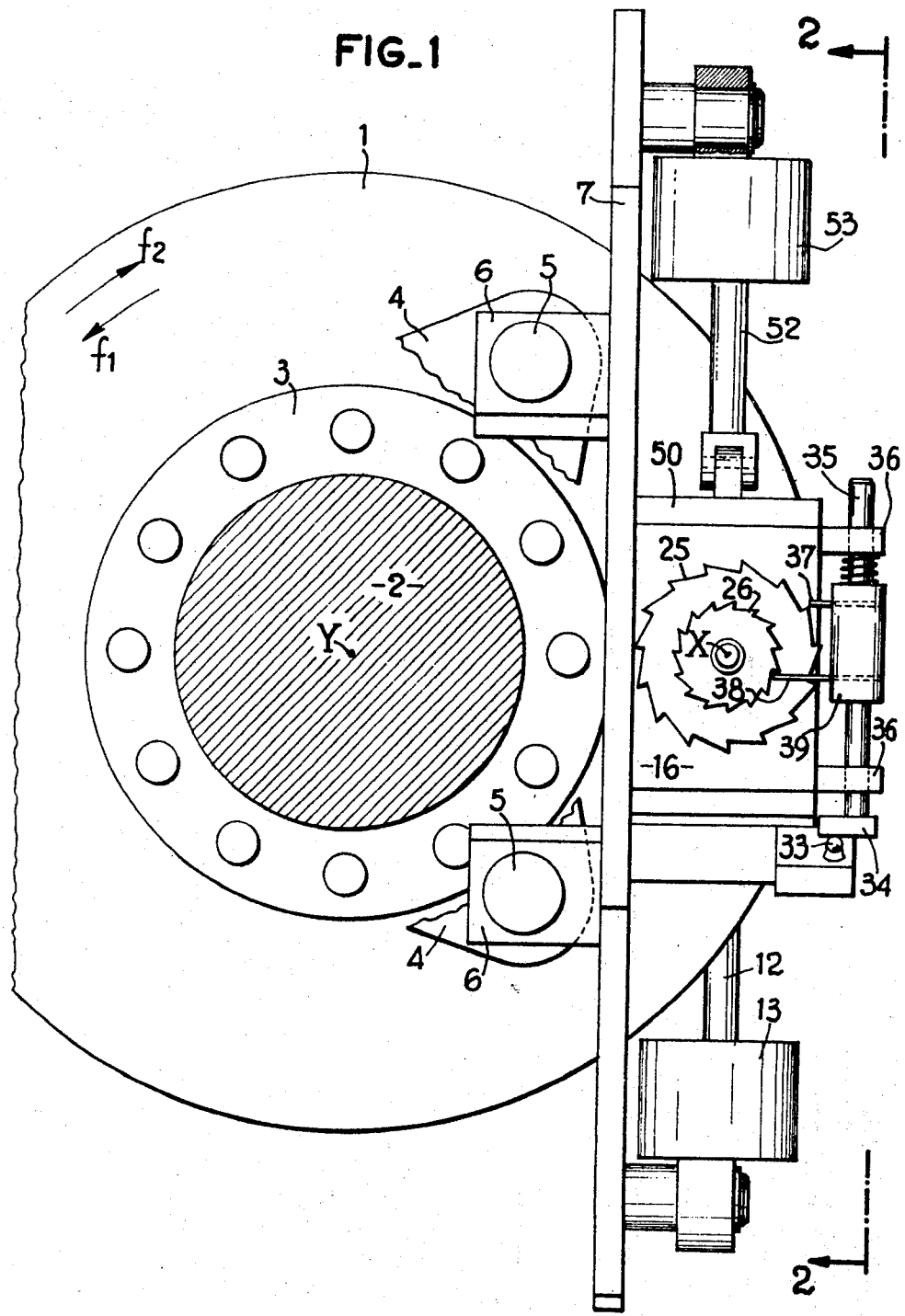
FIG. 1 is a diagrammatic elevational view of a brake device according to the invention.

In the embodiment shown in FIGS. 1–4, the brake device according to the invention is applied to a moving element in the form of a disc 1 which is fixed to a coaxial wheel (not shown). The disc 1 has an axis Y—Y and is integral with a rotary shaft 2 which is journalled in a hub 3 fixed to a bracket 4 mounted on the chassis of a vehicle (not shown). This vehicle may be for example a railway vehicle capable of moving in either direction.

The bracket 4 is a plate parallel to the disc 1. It carries two parallel pins 5 constituting slideways which are perpendicular to the bracket 4 and disc 1 and parallel to the axis Y—Y. Slidable on these pins 5 are ears 6 of a floating support or caliper 7 in the form of a plate perpendicular to the median plane P—P of the disc 1. The caliper 7 is provided with a wide slot 8 which allows the passage for a part of the disc 1 which thus projects with respect to the caliper 7 and offers both sides to the braking means.

The caliper 7 carries two brake sub-assemblies comprising braking means and their actuating means and means for taking up wear which partly are similar to those described in U.S. Pat. No. 3,727,727.

According to the invention, the two brake sub-assemblies are disposed in head-to-toe or opposed relation on each side of the disc 1. Thus, on each side of the disc 1 there are identical means which are oriented symmetrically with respect to the point O contained in the median plane of symmetry P—P of the disc and through which pass the axes X—X of the support means and the means for taking up wear described hereinafter.

Figure 2:
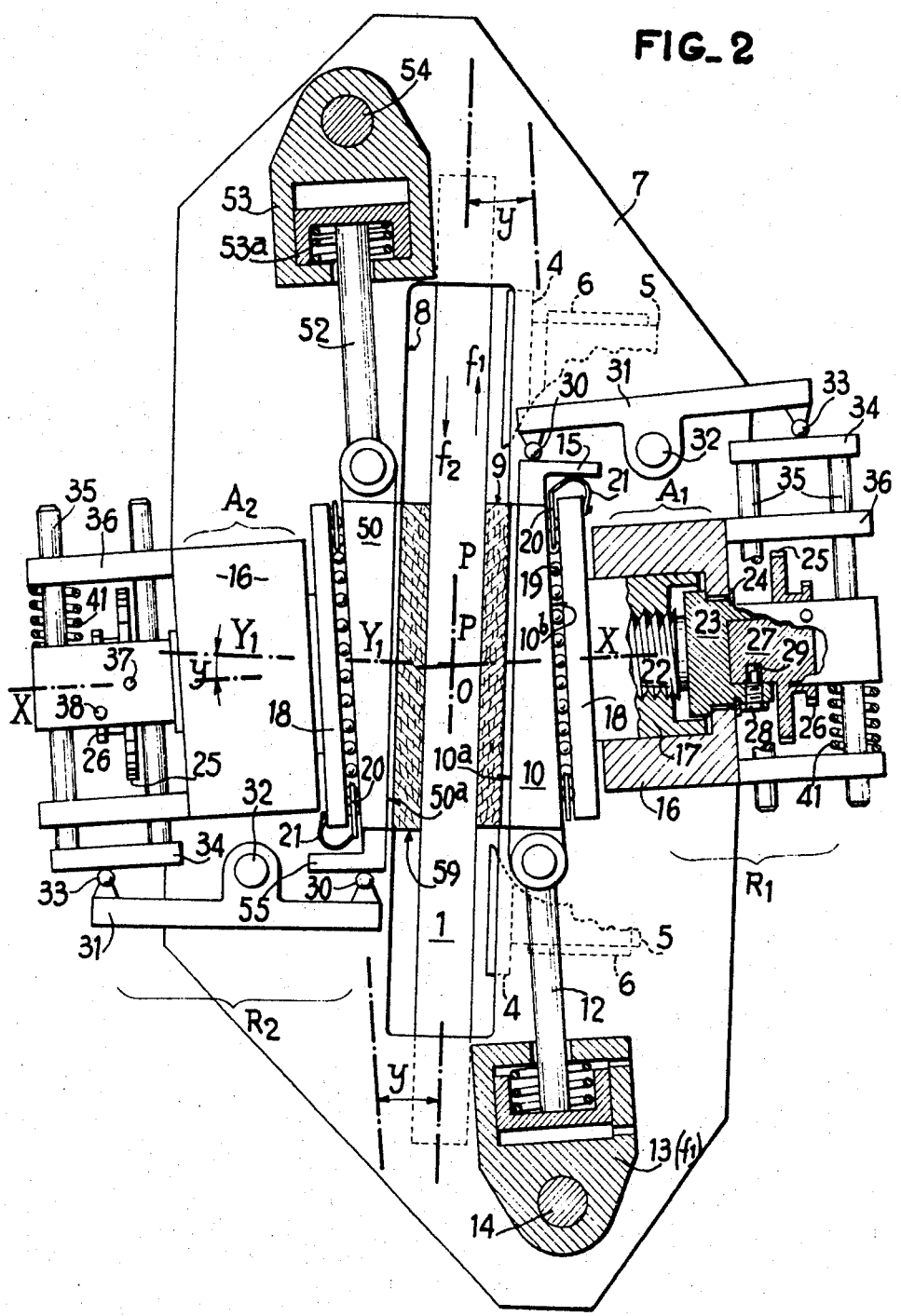
FIG. 2 is a plan view on line 2—2 of FIG. 1 with parts cut away.

The perpendicular to the plane P—P at this point O parallel to the axis Y—Y of the disc is designated $Y_1—Y_1$ in FIG. 2.

Each brake pad 9, 59 having surfaces parallel to the disc 1 is carried by a wedge member 10, 50 whose surface 10a, 50a adjacent the pad 9, 59 is parallel to the disc and whose other surface 10b, 59b is slightly inclined with respect to the surface 10a, 50a with which it forms a small acute angle y preferably, but not exclusively, less than 20°.

The larger end of the wedge member 10, 50 is pivoted at 11, 51 to one end of a rod 12, 52 of a piston of a cylinder device 13, 53 constituting brake actuating means, this device being pivoted at 14, 54 to the floating caliper 7. The piston of each cylinder device 13, 53 is subjected to the action of a return spring 13a, 53a. The smaller end of the wedge member 10, 50 is integral with an abutment 15, 55 which affords a wide support face to a connecting lever operatively connected to a device for taking up wear.

According to the invention, that one of the pads 9 and 59, shifted by the wedge members 10 and 50, which tends to be moved by the disc 1 in the same direction as that in which the braking force is exerted by its cylinder device 13 or 53 i.e. tends to be self-energizing, is temporarily held stationary relative to the floating caliper 7 owing to the end-of-travel abutment of the piston of the cylinder device 13 or 53. In FIG. 2 it is the pad 59 when the disc 1 rotates in the direction of arrow $f_2$ and the pad 9 when the disc 1 rotates in the direction of arrow $f_1$. It will be understood that the pad on the opposite side of the disc 1 acts as a self-releasing pad.

Provided for each pad 9, 59 is a fixed support means $A_1$, $A_2$ (FIGS. 2 and 3) having a general axis X—X which is perpendicular to the inclined surfaces 10b, 50b of the wedge members 10, 50 and therefore makes an angle $y$ with the perpendicular $Y_1$—$Y_1$ to the disc 1. As the support means $A_1$, $A_2$ are identical, identical reference characters will be employed for designating their corresponding component parts. Each support means $A_1$, $A_2$ comprises a hollow support block 16 fixed to the caliper 7 and having an axis X—X and movable support elements for the wedge member 10, 50 and the pad 9, 59. Slidable inside the block 16 is a cylindrical sleeve 17 which has an internal screwthread and constitutes a nut for taking up wear of the pad 9, 50. This nut is prevented from rotating owing to the fact that it carries a rectangular support plate or abutment 18 which bears against the caliper 7. As viewed in plan in FIG. 1, this support plate 18 is oriented with respect to the caliper 7 in the same way as the block 16 is oriented with respect to the caliper 7. The plate 18 is perpendicular to the axis X—X and therefore inclined with respect to the disc 1 and parallel to the surface 10b 50b of the wedge member 10, 50. Each plate 18 against which the support or abutment reaction is exerted must be very strong and undeformable since this reaction is of high magnitude. It must afford the brake pad 9, 59 a support surface having a low coefficient of friction in order to avoid wear. This is why in the presently-described embodiment a rolling bearing, comprising a cage 19 combined with small-diameter, that is thin, parallel rollers, is interposed between the plate 18 and the wedge member 10, 50 carrying the pad 9, 59. The cage 19 is movable along the plate 18 and is extended by a rod 20 which is subjected to the action of a resiliently yieldable return means, such as a spring strip 21, which is fixed to the plate 18 and biases the cage 19 toward the wide end of the wedge member 10, 50.

Screwed inside the sleeve 17 is a screw 22 which is part of a device for taking up wear of the pad and has a head 23 (FIGS. 2 and 3) prevented from moving axially relative to the support block 16 by a circlip 24. According to the invention, the head 23 of the screw is hollow and connected to rotate, but with a given angular play, with a pair of toothed wheels or ratchets 25 and 26 centered on the axis X—X. According to the invention, the ratchet 25 serves to take up wear whereas the other ratchet 26 serves to neutralize the device for taking up wear.

The ratchets 25 and 26 are integral with a single member 27 which is journalled in the hollow part of the head 23 of the screw 22 and connected to rotate with the head 23 by a radial teat-screw 28. The teat end of the screw 28 extends into a radial recess 29 in the member 27. The recess 29 defines no longitudinal clearance with the teat in the direction parallel to the axis X—X but does define an angular or circumferential clearance with this teat (FIGS. 5 and 6). This clearance results in angular play which exceeds the angle of rotation of the ratchet 26 for neutralizing the device for taking up wear so that the head 23 of the screw 22 is driven in rotation by the ratchet 25 for taking up wear in a direction $s_1$ but not by the ratchet 26 for neutralizing the device for taking up wear in the direction $s_2$.

Thus, the member 27 carrying the ratchets 25 and 26 is prevented from moving axially with respect to the head 23 of the screw 22 and is capable of rotating slightly in the hollow portion of the head 23 without rotating the screw 22 when it is the ratchet 26 which causes the rotation. This avoids subjecting the screw 28 to excessive stress, since the torque necessary for rotating the screw 22 in the direction $S_2$ is relatively high owing to the force due to the braking to which its screwthreads are subjected. This is the purpose of the angular play afforded by the recess 29.

The parallel ratchets 25 and 26 are essentially characterized (FIGS. 4, 5 and 6) by teeth which have a sawtooth shape and an identical angular division (same number of teeth) but are disposed in opposite directions. They may have different diameters, but this is not essential. In the presently-described embodiment the ratchet 26 has a diameter smaller than that of the ratchet 25.

The length $l_1$ of a tooth of the ratchet 25 for taking up wear corresponds to the approach travel of the pad 9, 59 in the inclined direction of the braking force (travel in the direction parallel to the axis of the cylinder device 13, 53).

The length $l_2$ of a tooth of the ratchet 26 for neutralizing the device for taking up wear corresponds to a travel exceeding that corresponding to the length $l_1$ but the length $l_2$ is in fact shorter than the length $l_1$ due to the ratio between the diameters of the ratchet 25 and ratchet 26.

The ratchets 25 and 26 co-operate with pawls to which further reference will be made hereinafter.

Returning to the abutment 15, the latter bears against one end 30 of the lever 31 pivoted at 32 to the caliper 7. The other end 33 of the lever 31 bears against an abutment plate 34 which actuates the device for taking up wear. The ends 30 and 33 of the lever 31 are advantageously rounded, for example they have a cylindrical shape. The abutment plate 34 carries a pair of pins 35 slidable in a pair of guide lugs 36 integral with the support block 16. The pins 35 are parallel to tangents to the ratchets 25 and 26 and carry a block 39 supporting pawls 37 and 38. One pawl, 37, co-operates with the ratchet 25 and the other pawl, 38, c-ooperates with the ratchet 26 for neutralizing the device for taking up wear.

The pawls 27 and 28 slide in the block 39 in opposition to the action of spring strips 40 secured to the block 39 so that the pawls rise and descend upon each passage through one tooth of a ratchet 25 or 26. The parallel pawls 37 and 38 are spaced apart in a direction parallel to the pins 35 a distance D which is slightly greater than the sum of the length $l_1$ and $l_2$ of each tooth of the ratchets 25 and 26.

Thus, when the travel of the block 39 and pawls 37 and 38 in the direction $f_3$ in respect of the device $R_1$ for taking up wear (FIG. 5) is less than or equal to $l_1$, the pawl 38 never reaches a tooth of the ratchet 26. On the other hand, when the travel of the block 39 of the other device $R_2$ for taking up wear (FIG. 6) in the direction of arrow $f_3$ exceeds $l_1$, the pawl 38 reaches a tooth of the ratchet 26 and rotates it whereas the pawl 37 moves away from the ratchet 25.

A return coil spring 41 is compressed between the block 39 and a guide lug 36 pertaining to the support block 16. The spring 41 biases the ratchets 25 and 26 to return to the initial position when the brake is released.

The brake device operates in the following manner:

In the following description it will be assumed that the disc 1 rotates in the direction of arrow $f_2$ since this corresponds to the illustration in FIG. 2. It will be easier to understand what occurs in the case of a rotation of the disc in the direction of arrow $f_1$ hereinafter.

1. Direction of rotation $f_2$ of the disc 1.

The fluid under pressure is supplied to the cylinder devices 13, 53. The pad 9, shifted by the wedge member 10 in the direction opposed to the direction of rotation of the disc 1, is subjected to the resultant of two opposing forces: a thrust force exerted by the cylinder device 13 and a tangential contrary force exerted by the disc 1. This is why the piston of the cylinder device 13 does not at the end of the travel of the piston abut the end of the cylinder. The first pad 9 remains stationary with respect to the caliper 7 during the application of the brake and operates consequently in accordance with the principle of inclined orientation described in the aforementioned U.S. Pat. No. 3,727,727.

On the other hand, the second pad 59, whose wedge member 50 is urged by the cylinder device 53 in the direction $f_2$ of rotation of the disc 1, is subjected to a resultant of the aforementioned forces which are added to each other instead of being substracted from each other. In other words, the wedge member 50 tends to be driven along or drawn in by the effect of the rotation of the disc 1. Consequently, the piston of the cylinder 53 rapidly reaches an abutment at the end of the cylinder and the second pad 59 having the wedge member 50 is thus temporarily fixed in position on the caliper 7. The travel of the pad 59, thus in position of abutment of the piston at the end of the cylinder of the cylinder device 53, exceeds that of the other pad 9 which is not in position of abutment of the piston with the end of the cylinder of the cylinder device 13. In contradistinction to the pad 9 the pad 59 has no longer possibility of independent movement with respect to the disc 1 and can only move with the floating caliper 7. The caliper, which is slidable by its ears 6 on the pins 5 in a direction parallel to the axis Y—Y of rotation of the disc 1, by a reaction to the movement of the pad 9 shifts the pad 59 in the direction parallel to the axis Y—Y.

The braking is carried out under the conditions of stability explained in the aforementioned U.S. Pat. No. 3,727,727 owing to two pads 9 and 59 irrespective of variations in the coefficient of friction.

Indeed, by reaction of the caliper 7 to the forces exerted perpendicular to the disc by the pad 9, the pad 59 also receives these forces transmitted thereto by the caliper 7. Bearing in mind that the forces perpendicular to the disc vary in a manner which is inversely proportional to the coefficients of friction and that the latter are identical for the pads 9 and 59, the braking forces are on each side of the disc 1 identical and of high stability without having to orient the forces on the side of the disc corresponding to the pad 59 which tends to be driven along by the disc 1 (direction $f_2$).

To release the brake, the cylinder devices 13, 53 are connected to the discharge and their pistons are returned to their initial positions by the springs 13a, 53a. The wedge members 10 and 50 and the pads 9 and 59 are consequently returned elastically rearwardly so that the pads 9 and 59 move away from the disc 1.

The two devices $R_1$ and $R_2$ for taking up wear operate in the following manner:

$R_1$ (FIG. 5): when the brake is applied, the block 39 under the thrust exerted by the wedge member 10, transmitted by the abutment 15, the lever 31 and the plate 34, moves in the direction $f_3$ a distance less than the length $l_1$ of oen tooth of the ratchet 25 for taking up wear. Indeed, the wear of the brake pads in the course of the preceding application of the brake, as for each application of the brake, is very small. The pawl 37 moves from a position 37a to a position 37b without jumping or going beyond one tooth of the ratchet 25. The pawl 38 moves from the position 38a to the position 38b without reaching a tooth of the ratchet 26 for neutralizing the device for taking up of wear. The ratchets 25 and 26 therefore do not rotate. When the brake is released, the block 39 and the pawls 37 and 38 return elastically to their initial position under the effect of the return spring 41. The ratchets 25 and 26 still do not rotate. Therefore, no wear is taken up. In the course of a plurality of successive applications of the brake, the device $R_1$ will operate in the aforementioned manner so long as the sum of the elementary wears which occur upon each application of the brake is too small to give a sufficient travel to the pawl 37. However, at a certain moment, for example after about 10 or 15 applications of the brake, the wear of the pads 9 and 59 becomes such that the block 39 and the pawls 37 and 38 move in the direction of arrow $f_3$ a distance equal to at least the length $l_1$ of one tooth of the ratchet 25 for taking up wear. The pawls 37, 38 move from the initial position 37a, 38a shown in full line to the final position 37c, 38c shown in dotted line. The pawl 37 thus jumps one tooth of the ratchet 25 whereas the pawl 38 hardly reaches a tooth of the ratchet 26. The device for taking up wear is thus "armed." Upon releasing the brake, the block 39 is returned elastically in the direction $f_4$ by the spring 41 and moves the pawls 37 and 38 from the positions 37c, 38c to the initial positions 37a, 38a. But whereas the pawl 38 moves away from the neutralizing ratchet 26 without doing anything, the pawl 37 drives the ratchet 25 for taking up wear in rotation, and therefore also the ratchet 26, in the direction $S_1$ for taking up wear. Now, the angular clearance defined by the recess 29 is placed in such manner that it permits the head 23 of the screw 22 to be driven by the member 27 in the direction of arrow $s_1$. The screw 22 therefore rotates. The nut 17 advances and urges the pad 9 toward the disc 1 a distance corresponding to the wear thereof. As can be seen, wear is taken up after a certain number of applications of the brake each one of which produces an elementary wear of the pads. The number of actions of application of the brake that it is possible to effect in the direction for moving the pawl 37 to the position 37c before causing it to jump one tooth of the ratchet 25 depends on the pitch of the screwthread of the screw 22 and nut 17. When the brake is released, the cylinder devices 13, 53 having been connected to the discharge and the springs 13a, 33a having urged the pistons to their initial position, the force perpendicular to the disc 1 in the system comprising the screw 22 and nut 17 is released. When there is play in the system comprising the screw 22 and nut 17, as the support plate 34 of the device $R_1$ for taking up wear is no longer in contact with the end 33 of the lever 31, the assembly for taking up wear 39-37-38 is returned by the springs 41 to its initial position. The plate 34 resumes contact with the end 33 of the lever 31 so that the other end 30 of the lever 31 resumes contact with the abutment 15. In the course of this movement, the ratchets 25 and 26 have resumed their initial positions.

$R_2$ (FIG. 6): it has been seen that, when applying the brake, the fact of adding the force exerted by the wedge member 50 and tangential force exerted by the disc 1, the travel of the piston of the cylinder device 53, and therefore that of the wedge member 50, is longer than that of the corresponding parts situated on the other side of the disc 1. Consequently, the travel of the block 39 in the direction $s_3$ corresponding to that of the wedge member 10 (FIG. 2) exceeds the distance between the pawl 38a of the nearest accessible tooth of the neutralizing ratchet 26. This travel exceeding the length $l_1$ of one tooth of the ratchet 26 causes the pawl 37 to move from the position 37a to the position 37d. It moves away from the ratchet 25. On the other hand, the pawl 38a moves to the position 38d by rotating the ratchet 26 and the ratchet 25 in the direction $s_2$ which is the reverse of the direction for taking up wear. The ratchets 25 and 26 therefore rotate from the position shown in full line to the position shown in dotted line in FIG. 6. Owing to the angular clearance between the recess 29 and the screw 28, this clearance exceeding the angle of rotation of the ratchet 26, the member 23 is not driven in rotation by the member 26. Therefore, there is no unscrewing of the screw 22 nor any moving away of the first pad 9 from the disc 1.

When the brake is released, the block 39 and the pawls 37 and 38, biased by the spring 41, resume their initial positions by turning the ratchets 25 and 26 in the direction $s_1$ but without rotating the head 23 of the screw 22 owing to the angular play afforded by the recess 29.

Upon each application of the brake, the device $R_2$ operates in the aforementioned manner.

Although the device $R_2$ is neutralized, the pad 59 is moved toward the disc 1 when the opposite pad 9 is moved toward the disc when taking up its wear: the movement of the pad 59 for taking up its wear is achieved by the reaction of the caliper 7 which transmits the movements of the pad 9.

Thus, it will be understood how the disc 1 could be blocked if the device $R_2$ for taking up wear was not neutralized: the second pad 59 could then be moved toward the disc 1 upon each application of the brake. Such travels for taking up wear would quickly cause a permanent gripping of the disc 1, whether the cylinder devices 13 be supplied or not supplied with fluid under pressure.

2. Direction of rotation $f_1$ of the disc 1:

This hypothesis has not been illustrated in the drawing, in particular for the positions of the pistons of the cylinder devices 13, 53 (FIG. 2) and of the pawls 37 and 38 with respect to the ratchets 25 and 26 (FIGS. 5 and 6), but the operation may be deduced from that explained hereinbefore, the functions being reversed.

It is the wedge member 10 for shifting the pad 9 which tends to be drawn in, that is to say driven along, by the disc 1 in the same direction as the thrust exerted thereon by the cylinder device 13. It is therefore the cylinder device 13 which will be in its position corresponding to the end of travel abutment of the piston with the cylinder and consequently the pad 9 with its wedge member 10 which will be held stationary with respect to the caliper 7 at the end of travel of the piston of the cylinder device 13. Its device $R_1$ for taking up wear is then neutralized as explained hereinbefore with reference to the device $R_2$ for the direction of rotation $f_2$. It is the second pad 59 having the wedge member 50 on which a force is exerted by the cylinder device 53 which tends to oppose movement in the direction of rotation $f_1$ of the disc 1, which will operate in accordance with the principle of inclined orientation explained in the U.S. Pat. No. 3,727,727. It is therefore the second pad 59 which will operate under the conditions of stability and it is its device $R_2$ for taking up wear which will be active as explained hereinbefore with reference to the device $R_1$ in the case of the rotation of the disc 1 in the direction of arrow $f_2$.

To summarize, owing to the reversed symmetrical orientation of the brake sub-assemblies with respect to the centre 0 of the brake device in combination with the floating caliper 7 and owing to the neutralization of one of the devices $R_1$ and $R_2$, the brake device according to the invention may operate under conditions of stability and efficiency described in U.S. Pat. No. 3,727,727 in both directions of rotation of the disc 1, and the desired reversibility of the advantage of stability is obtained.

When the disc 1 rotates in one direction $f_1$ it is the pad 9 with its wedge member 10 which tends to be driven or drawn in by the disc 1 which is temporarily rendered integral with the caliper 7 when applying the brake. its device $R_1$ for taking up wear is neutralized. The other pad 59 with its wedge member 50 which tends to oppose the rotation of the disc 1 remains movable with respect to the caliper 7 in the aforementioned inclined direction of orientation of the forces. Its device $R_2$ for taking up wear is operative.

When the disc rotates in the opposite direction $f_2$ the functions of the two sub-assemblies are reversed.

It will be noted that the neutralization of a device for taking up wear is possible owing to the second ratchet 26, the corresponding pawl 38, the screw 28 and the recess 29 affording angular play provided in the means for connecting the member 27 to the head 23 of the screw 22 for taking up wear. The unidirectional taking up of wear is thus ensured, the screw 22 always being able to rotate in the direction for moving a pad 9, 59 toward the disc 1 but never in the direction for moving this pad away from the disc.

By way of modification, it will be clear that the brake according to the invention may be easily adapted to a rotation of the disc 1 in a single direction. It is sufficient to secure one of the plates 18 to the caliper 7, the plate 18 thus secured being that having the pad 9, 59 whose wedge member 10, 50 tends to be driven along or drawn in by the disc 1. In this case, the device for taking up the wear of this pad thus rendered integral with the caliper 7 may be dispensed with and the device of the other pad 9, 59 which ensures the stability simplified by elimination of the ratchet 26 and its neutralizing pawl 38, elimination of the recess 29 affording a radial clearance and a complete or direct interconnection between the ratchet 25 for taking up wear and the head 23 of the screw 22.

Having now described my invention, what I claim as new and desire to secure by Letters Patent is:

1. A self-releasing device for braking a moving element movable in opposite directions, such as a disc, having two parallel rubbing surfaces, the device comprising a support; two brake sub-assemblies disposed one on each side of the moving element on the support; each sub-assembly comprising support means fixed to the support and having a support surface slightly inclined with respect to the corresponding adjacent rubbing surface of the moving element, means defining a brake pad having a friction surface parallel to the corresponding rubbing surface and an inclined surface parallel to the corresponding support surface and co-operative with the support surface, actuating means connected to the pad and arranged to act on the pad in a direction for causing the pad to effect a given displacement relative to the support for braking; the two brake sub-assemblies being oriented in opposite directions on each side of the moving element so that, for a given direction of movement of the moving element and upon braking, a first of the two brake pads of the two sub-assemblies is self-releasing and a second of said two brake pads tends to be drawn along by the moving element in a direction corresponding to said displacement for braking and, in an opposite direction of movement of the moving element, said first brake pad tends to be drawn along by the moving element in a direction corresponding to said displacement for braking and said second brake pad is self-releasing, the support being capable of moving relative to the moving element in a direction substantially perpendicular to the rubbing surfaces; each sub-assembly having further means responsive to the direction of movement of the moving element for automatically arresting, in each direction of movement of the moving element, the braking displacement relative to the support of that one of the two brake pads which tends to be drawn along by the moving element in a direction for effecting its braking displacement before the other brake pad has reached the end of its given braking displacement relative to the support.

2. A device as claimed in claim 1, wherein said further means comprise an end-of-travel abutment system included in the actuating means for each pad which abutment system is capable of stopping operation of said actuating means and preventing movement of the associated pad in said displacement thereof with respect to the support for braking.

3. A device as claimed in claim 2, wherein the actuating means comprise a fluid cylinder device having a cylinder fixed to the support and a piston movable within the cylinder and said abutment system comprises an arrangement in which arrangement the piston of the cylinder device encounters an end of the cylinder of the cylinder device.

4. A device as claimed in claim 1, wherein each sub-assembly comprises a device for taking up wear of the pad, the device for taking up wear carrying the support means and acting along an axis which is slightly inclined with respect to the perpendicular to the rubbing surface, the axes of the two devices for taking up wear being in the extension of each other.

5. A device as claimed in claim 4, wherein each device for taking up wear is adapted to be unidirectional in operation, that is to say operative in one direction of movement of the moving element and neutralized in the other direction of movement of the moving element.

6. A device as claimed in claim 5, wherein the device for taking up wear which is mounted on the side of the moving element corresponding to the pad which is self-releasing is operative in the event of wear of the pad whereas the device for taking up wear mounted on the opposite side of the moving element corresponding to the pad which tends to be drawn along by the moving element in the direction corresponding to said displacement thereof for braking is neutralized.

7. A device as claimed in claim 1, wherein in the case where the moving element is capable of moving mostly in a single direction, a device for taking up wear is provided for the pad which is self-releasing, the support surface for the other pad being fixed in position relative to the support.

8. A device as claimed in claim 7, wherein the device for taking up wear carries the support means and acts along an axis which is slightly inclined with respect to the perpendicular to the rubbing surface.

9. A device for braking a moving element movable in opposite directions, such as a disc, having two parallel rubbing surfaces, the device comprising a support; two brake sub-assemblies disposed one on each side of the moving element on the support; each sub-assembly comprising support means fixed to the support and having a support surface slightly inclined with respect to the corresponding adjacent rubbing surface of the moving element, means defining a brake pad having a friction surface parallel to the corresponding rubbing surface and an inclined surface parallel to the corresponding support surface and co-operative with the support surface, actuating means connected to the pad and arranged to act on the pad in a direction for causing the pad to effect a movement relative to the support for braking the moving element; the two brake sub-assemblies being oriented in opposite directions on each side of the moving element so that one of said brake pads is self-releasing and the other brake pad tends to be drawn along by the moving element in a direction corresponding to said movement thereof for braking in one direction of movement of the moving element and vice-versa in the other direction of movement of the moving element, the support being capable of moving in a direction substantially perpendicular to the rubbing surfaces, each sub-assembly having further means responsive to the direction of movement of the moving element for stopping, in one direction of movement of the moving element, a braking movement relative to the support of one of the brake pads and stopping, in the opposite direction of movement of the moving element, a braking movement relative to the support of the other of said brake pads, whereby the braking device operates in the manner of a brake device having a brake pad stationary on the support on one side of the moving element and a brake pad operative to be applied against the moving element on the other side of the moving element in each direction of movement of the moving element, devices for taking up wear of each pad, each of said devices comprising a nut movable in translation but prevented from rotating relative to the support and integral with the pad, a screw screwthreadedly co-operative with said nut and rotatable but axially stationary relative to the support, a ratched and pawl system operatively connected to the screw to rotate the screw, an abutment member integral with the pad, a rockable lever supported relative to the support and having a first end portion and a second end portion opposed to the first end portion relative to an axis about which the lever is rockable, the ratchet and pawl system being actuated by the abutment member through the rockable lever which transmits the motion of the pad, each ratchet and pawl system comprising one pair of parallel ratchets connected to rotate with the screw but with a given angular play, the two ratchets having ratchet teeth of identical angular division, that is to say, having the same number of ratchet teeth which are disposed in reverse directions, a pin slidable relative to the support in a path parallel to the path of movement of the pad, the second portion of the rockable lever being engaged with the pin for sliding the pin when the pad undergoes wear, two parallel pawls carried by the pin to move with the pin and respectively co-operative with the two ratchets, one of the ratchets serving to take up wear and the other of the ratchets serving to neutralize that one of the two devices for taking up wear which is located on the same side of the moving element as the pad which tends to be drawn along by the moving element in the direction corresponding to said movement thereof for braking the moving element.

10. A device as claimed in claim 9, wherein the rotation of the neutralizing ratchet corresponds to the travel of the pad which tends to be drawn along by the moving element in the direction corresponding to said movement thereof for braking the moving element.

11. A device as claimed in claim 9, wherein the length of each tooth of the ratchet for taking up wear corresponds to the travel of the pad for braking relative to the support means and the length of one tooth of the neutralizing ratchet corresponds to a travel exceeding that of said each tooth but modified in accordance with the ratio between the diameters of the ratchets.

12. A device as claimed in claim 9, wherein the parallel pawls are spaced apart a distance slightly greater than the sum of the lengths of the respective teeth of the two ratchets.

13. A device as claimed in claim 9, wherein the ratchets are connected to rotate with a member having a recess defining an angular clearance with a screwthreaded member carried by and extending radially of the screw.

14. A device as claimed in claim 13, wherein said angular clearance afforded by the recess is equal to the angle of rotation through one tooth of the ratchet for taking up wear and the recess is combined with the screwthreaded member in such manner that the screw is driven in rotation by rotation of the ratchet for taking up wear in the direction for taking up wear but not by the rotation of the neutralizing ratchet in the direction opposed to the direction for taking up wear.

15. A device as claimed in claim 9, wherein the neutralizing ratchet has a diameter less than the diameter of the ratchet for taking up wear.

* * * * *